(12) United States Patent
Ing

(10) Patent No.: US 8,392,486 B2
(45) Date of Patent: Mar. 5, 2013

(54) METHOD FOR DETERMINING THE POSITION OF IMPACTS

(75) Inventor: Ros Kiri Ing, Paris (FR)

(73) Assignee: Elo Touch Solutions, Inc., Menlo Park, CA (US)

( * ) Notice: Subject to any disclaimer, the term of this patent is extended or adjusted under 35 U.S.C. 154(b) by 1282 days.

(21) Appl. No.: 11/813,113

(22) PCT Filed: Dec. 29, 2004

(86) PCT No.: PCT/EP2004/014908
§ 371 (c)(1), (2), (4) Date: Apr. 28, 2008

(87) PCT Pub. No.: WO2006/069596
PCT Pub. Date: Jul. 6, 2006

(65) Prior Publication Data
US 2011/0137968 A1    Jun. 9, 2011

(51) Int. Cl.
*G06E 1/04* (2006.01)
(52) U.S. Cl. ............................................ 708/191
(58) Field of Classification Search .......... 708/191, 708/815–816
See application file for complete search history.

(56) References Cited

U.S. PATENT DOCUMENTS

| 5,691,959 | A | 11/1997 | Kriewall et al. |
| 7,345,677 | B2 * | 3/2008 | Ing et al. ................ 345/173 |
| 2004/0173389 | A1 * | 9/2004 | Sullivan .................. 702/56 |
| 2005/0174338 | A1 | 8/2005 | Ing et al. |

FOREIGN PATENT DOCUMENTS

| FR | 2841022 | 6/2002 |
| WO | 01/43063 | 6/2001 |
| WO | WO03/005292 | 1/2003 |
| WO | 03/067511 | 8/2003 |

* cited by examiner

*Primary Examiner* — Tan V. Mai
(74) *Attorney, Agent, or Firm* — Alston & Bird LLP

(57) ABSTRACT

A method for determining the position of impacts on an object comprising two acoustic sensors, and N active areas of said object, comprises the steps of: (a) receiving two acoustic signals $S_1(t)$ and $S_2(t)$; (b) calculating a sample signature function $SIG_S(\omega)=S_1(\omega)-S_2(\omega)^*$, where $S_1(\omega)$ and $S_2(\omega)$ are the respective Fourier transforms of $S_1(t)$ and $S_2(t)$, (c) comparing $SIG_S(\omega)$ with N predetermined reference signature functions $SIG_{R_j}(\omega)$ corresponding to the predetermined area j for j from 1 to N; (d) determining the active area in which the impact occurred, on the basis of the comparison of step (c).

34 Claims, 4 Drawing Sheets

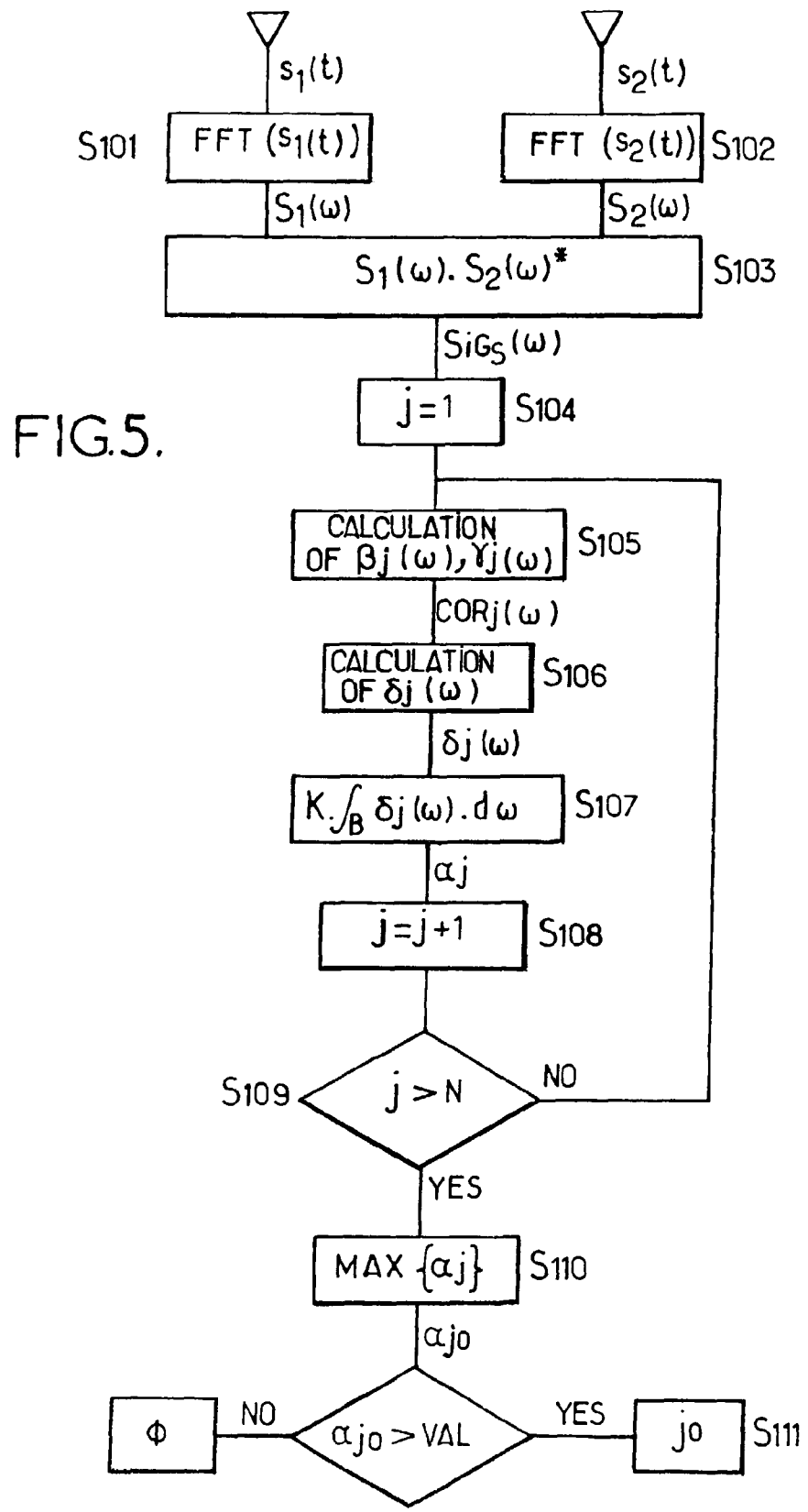

METHOD FOR DETERMINING THE POSITION OF IMPACTS

CROSS-REFERENCE TO RELATED APPLICATIONS

This application is being filed as a U.S. National Stage under 35 U.S.C. 371 of International Application No. PCT/EP2004/014908, filed on Dec. 29, 2004, the content of which is incorporated herein by reference in its entirety.

FIELD OF THE INVENTION

The present invention relates to a method for determining the position of impacts, and a device using this method.

BACKGROUND OF THE INVENTION

A known method for determining the position of impacts on an object is suggested by Patent FR 2 841 022. According to this document, the object may comprise two acoustic sensors and N predetermined active areas of said object, whereby N is an integer at least equal to 1. In order to determine the active area in which an impact occurred, acoustic signals received by the acoustic sensors are compared with N acoustic signals, recorded in a database, and each corresponding with one of the N predetermined areas. Consequently, it leads to 2N comparison calculations to complete the task, when two sensors are used.

An object of the present invention is to provide a method for determining an impact position, whose calculation velocity is improved, and which does not require a high computing power.

SUMMARY OF THE INVENTION

The invention thus proposes a method for determining the position of impacts on an object, said object comprising:
two acoustic sensors;
N predetermined active areas, whereby N is an integer at least equal to 1;
said method comprising the steps of:
(a) receiving two acoustic signals $S_1(t)$ and $S_2(t)$ originating respectively from said acoustic sensors and generated by an impact received on said object;
(b) calculating a sample signature function:

$$SIG_S(\omega)=S_1(\omega) \cdot S_2(\omega)^*,$$

where $S_1(\omega)$ and $S_2(\omega)$ are the respective Fourier transforms of $S_1(t)$ and $S_2(t)$, and where * is the complex conjugate operator;
(c) comparing $SIG_S(\omega)$ with N predetermined reference signature functions $SIG_{Rj}(\omega)$ each corresponding to a predetermined active area j, for j from 1 to N;
(d) determining an active area in which the impact occurred, on the basis of the comparison of step (c).

In various embodiments of the method according to the invention, at least one of the following characteristics may be used:
each reference signature function equals:

$$SIG_{Rj}(\omega)=R_{1j}(\omega) \cdot R_{2j}(\omega)^*$$

where $R_{1j}(\omega)$ and $R_{2j}(\omega)$ are Fourier transforms of acoustic signals $R_{1j}(t)$ and $r_{2j}(t)$ received by each of the respective acoustic sensors when an impact occurs on the predetermined area j;

step (c) comprises the calculation of a similarity estimator $\alpha_j$ representing a function of the phase $\phi(COR_j(\omega))$ of $COR_j(\omega)=SIG_{Rj}(\omega) \cdot SIG_S(\omega)^*$;

step (c) comprises the calculation of a function $\delta_j(\omega)$ for j from 1 to N, wherein
$\delta_j(\omega)=\epsilon_k$, if $\phi(COR_j(\omega))$ belongs to $I_k$,
where $\epsilon_k$ is a predetermined value and $I_k$ a corresponding angular interval for k from 1 to n, where n is an integer greater than 1;
the values $\epsilon_i$ are not greater than 1;
in the method:
if $|\phi(COR_j(\omega))| \leq a1$, then $\delta_j(\omega)=\epsilon_1$,
...
if n is greater than 2 and $a_{k-1} < |\phi(COR_j(\omega))| \leq a_k$, then $\delta_j(\omega)=\epsilon_k$, for $k=2 \ldots n-1$,
...
if $|\phi(COR_j(\omega))| > a_{n-1}$, then $\delta_j(\omega)=\epsilon_n$,
wherein $a_k$ is increasing with k and $\epsilon_k$ is decreasing with k;
in the method:
if $Re(COR_j(\omega)) \geq |Im(COR_j(\omega))|/\tan(a_1)$, then $\delta_j(\omega)=\epsilon_1$,
...
if n is greater than 2 and $|Im(COR_j(\omega))|/\tan(a_{k-1}) > Re(COR_j(\omega)) \geq |Im(COR_j(\omega))|/\tan(a_k)$, then $\delta_j(\omega)=\epsilon_k$, for $k=2 \ldots n-1$,
...
else, $\delta_j(\omega)=\epsilon_n$,
and wherein $Re(COR_j(\omega))$ is the real part of $COR_j(\omega)$ and $Im(COR_j(\omega))$ is the imaginary part of $COR_j(\omega)$;
in the method:
if $\gamma_j(\omega) \geq \beta_j(\omega)/\tan(a_1)$, then $\delta_j(\omega)=\epsilon_1=1$;
...
if n is greater than 2 and $\beta_j(\omega)/\tan(a_{k-1}) > \gamma_j(\omega) \geq \beta_j(\omega)/\tan(a_k)$, then $\delta_j(\omega)=\epsilon_k$, for $k=2, \ldots n-1$;
...
else, $\delta_j(\omega)=\epsilon_n$,
and wherein:
$\beta_j(\omega)=|1+\{A_j(\omega)/B_j(\omega)\} \cdot \{D(\omega)/C(\omega)\}|$,
$\gamma_j(\omega)=\text{sign } B_j(\omega) \cdot \text{sign } C(\omega) \cdot [\{A_j(\omega)/B_j(\omega)\}-\{D(\omega)/C(\omega)\}]$,
sign $B_j(\omega)=1$ if $B_j(\omega)$ is positive and $=-1$ if $B_j(\omega)$ is negative,
sign $C(\omega)=1$ if $C(\omega)$ is positive and $=-1$ if $C(\omega)$ is negative,
$A_j(\omega)$ and $B_j(\omega)$ are respectively the real part and the imaginary part of each reference signature function $SIG_{Rj}(\omega)$,
$C(\omega)$ and $D(\omega)$ are respectively the real part and the imaginary part of the complex conjugate sample signature function $SIG_S(\omega)^*$;
$\epsilon_1=1$ and $\epsilon_n=0$;
n is greater than 2 and $\epsilon_k=\cos(a_{k-1})$ for $k=2, \ldots n-1$.

$$\alpha_j = K \cdot \int_B \delta_j(\omega) \cdot d\omega,$$

where B is a frequency interval and K a constant;
$B=[\omega_{min}, \omega_{max}]$ and K is proportional to $1/(\omega_{max}-\omega_{min})$;
the active area $j_0$ in which the impact occurred is determined such that $\alpha_{j_0}$ is the greatest similarity estimator among the N calculated similarity estimators $\alpha_j$;
it is concluded that the impact occurred in the area $j_0$ only if $\alpha_{j_0}$ is considered as valid in step (d);
$\alpha_{j_0}$ is considered as valid if $\alpha_{j_0}$ is greater than a predetermined threshold of confidence;
it is concluded that there is no impact if $\alpha_{j_0}$ is not considered as valid in step (d);
step (a) begins if the acoustic signals $S_1(t)$ and $S_2(t)$ are above a predetermined trigger threshold;
the acoustic signals $S_1(t)$ and $S_2(t)$ in step (a) are delayed relative to real audio signals;
the Fourier transform is a Fast Fourier transform.

Besides, another object of the invention is a device for determining the position of impacts on an object, by comprising:

two acoustic sensors adapted to be borne by said object for receiving acoustic signals $S_1(t)$ and $S_2(t)$ generated by an impact on said object;

memory means comprising N reference signature functions, corresponding to N predetermined active areas of said object, whereby N is an integer at least equal to 1;

calculation means for calculating a sample signature function $$SIG_S(\omega) = S_1(\omega) \cdot S_2(\omega)^*,$$

where $S_1(\omega)$ and $S_2(\omega)$ are the respective Fourier transforms of $S_1(t)$ and $S_2(t)$, and where * is the complex conjugate operator;

comparison means for comparing $SIG_S(\omega)$ with N predetermined reference signature functions $SIG_{Rj}(\omega)$ for j from 1 to N;

processing means for determining an active area (1a) in which the impact occurred, on the basis of results given by said the comparison means.

In various embodiments of the device according to the invention, one may use one and/or other of the following features:

each reference signature function equals:

$$SIG_{Rj}(\omega) = R_1j(\omega) \cdot R_2j(\omega)^*$$

where $R_{1j}(\omega)$ and $R_{2j}(\omega)$ are Fourier transforms of acoustic signals $r_{1j}(t)$ and $r_{2j}(t)$ received by each of the respective acoustic sensors when an impact occurs on the predetermined area j;

said comparison means are adapted to calculate of a similarity estimator $\alpha_j$ representing a function of the phase $\phi(COR_j(\omega))$ of $COR_j(\omega) = SIG_{Rj}(\omega) \cdot SIG_S(\omega)^*$;

said comparison means are adapted to calculate a function $\delta_j(\omega)$ for j from 1 to N, wherein $\delta_j(\omega) = \epsilon_k$, if $\phi(COR_j(\omega))$ belongs to $I_k$, where $\epsilon_k$ is a predetermined value and $I_k$ a corresponding angular interval for k from 1 to n, where n is an integer greater than 1;

the values $\epsilon_i$ are not greater than 1;

said comparison means are adapted so that:

if $|\phi(COR_j(\omega)| \leq a1$, then $\delta_j(\omega) = \epsilon_1$,

. . .

if n is greater than 2 and $a_{k-1} < |\phi(COR_j(\omega))| \leq a_k$, then $\delta_j(\omega) = \epsilon_k$, for k=2 . . . n−1,

. . .

if $|\phi(COR_j(\omega))| > a_{n-1}$, then $\delta_j(\omega) = \epsilon_n$, wherein $a_k$ is increasing with k and $\epsilon_k$ is decreasing with k;

said comparison means are adapted so that:

if $Re(COR_j(\omega) > |Im(COR_j(\omega))|/\tan(a_1)$, then $\delta_j(\omega) = \epsilon_1$,

. . .

if n is greater than 2 and $|Im(COR_j(\omega))|/\tan(a_{k-1}) > Re(COR_j(\omega)) \geq |Im(COR_j(\omega))|/\tan(a_k)$, then $\delta_j(\omega) = \epsilon_k$, for k=2 . . . n−1,

. . .

else, $\delta_j(\omega) = \epsilon_n$, and wherein $Re(COR_j(\omega))$ is the real part of $COR_j(\omega)$ and $Im(COR_j(\omega))$ is the imaginary part of $COR_j(\omega)$;

said comparison means are adapted so that:

if $\gamma_j(\omega) \geq \beta_j(\omega)/\tan(a_1)$, then $\delta_j(\omega) = \epsilon_1 = 1$;

. . .

if n is greater than 2 and $\beta_j(\omega)/\tan(a_{k-1}) > \gamma_j(\omega) \geq \beta_j(\omega)/\tan(a_k)$, then $\delta_j(\omega) = \epsilon_k$, for k=2, . . . n−1;

. . .

else, $\delta_j(\omega) = \epsilon_n$, and wherein:

$\beta_j(\omega) = |1 + \{A_j(\omega)/B_j(\omega)\} \cdot \{(D(\omega)/C(\omega)\}|$, $\gamma_j(\omega) = $ sign $B_j(\omega) \cdot$ sign $C(\omega) \cdot [\{A_j(\omega)/B_j(\omega)\} - \{D(\omega)/C(\omega)\}]$, sign $B_j(\omega) = 1$ if $B_j(\omega)$ is positive and $=-1$ if $B_j(\omega)$ is negative, sign $C(\omega) = 1$ if $C(\omega)$ is positive and $=-1$ if $C(\omega)$ is negative, $A_j(\omega)$ and $B_j(\omega)$ are respectively the real part and the imaginary part of each reference signature function $SIG_{Rj}(\omega)$, $C(\omega)$ and $D(\omega)$ are respectively the real part and the imaginary part of the complex conjugate sample signature function $SIG_S(\omega)^*$;

$\epsilon_1 = 1$ and $\epsilon_n = 0$;

n is greater than 2 and $\epsilon_k = \cos(a_{k-1})$, for k=2, . . . n−1;

said comparison means are adapted so that:

$$\alpha_j = K \cdot \int_B \delta_j(\omega) \cdot d\omega,$$

where B is a frequency interval and K a constant;

the processing means are adapted to determine the active area $j_0$ in which the impact occurred such that $\alpha_{j_0}$ is the greatest similarity estimator among the N calculated similarity estimators $\alpha_j$;

the processing means are adapted to determine that the impact occurred in the area $j_0$ only if $\alpha_{j_0}$ is considered as valid;

the processing means are adapted to determine that $\alpha_{j_0}$ is valid if $\alpha_{j_0}$ is greater than a predetermined threshold of confidence;

the processing means are adapted to determine that there is no impact if $\alpha_{j_0}$ is not considered as valid.

This method and this device permit to reduce the number of comparisons to N, as the sampled acoustic signals are no longer compared with each reference acoustic signal, but with a signature function for each pair of reference acoustic signals. Furthermore, the calculation of the signature functions does not require a high calculation power. Moreover, as explained below, the phase of a signature function does not depend on the excitation waveform, but only on the place in which the impact occurred. Consequently, by studying only the phase of the signature function, the active area in which the impact occurred may be determined.

BRIEF DESCRIPTION THE DRAWINGS

Other features and advantages of the invention will appear from the following description of three embodiments of the invention, given by way of non-limiting example, with regard to the appended drawings. In the drawings:

FIG. 5 is a flow chart describing a method according to a third embodiment of the invention.

MORE DETAILED DESCRIPTION

Figure 1:
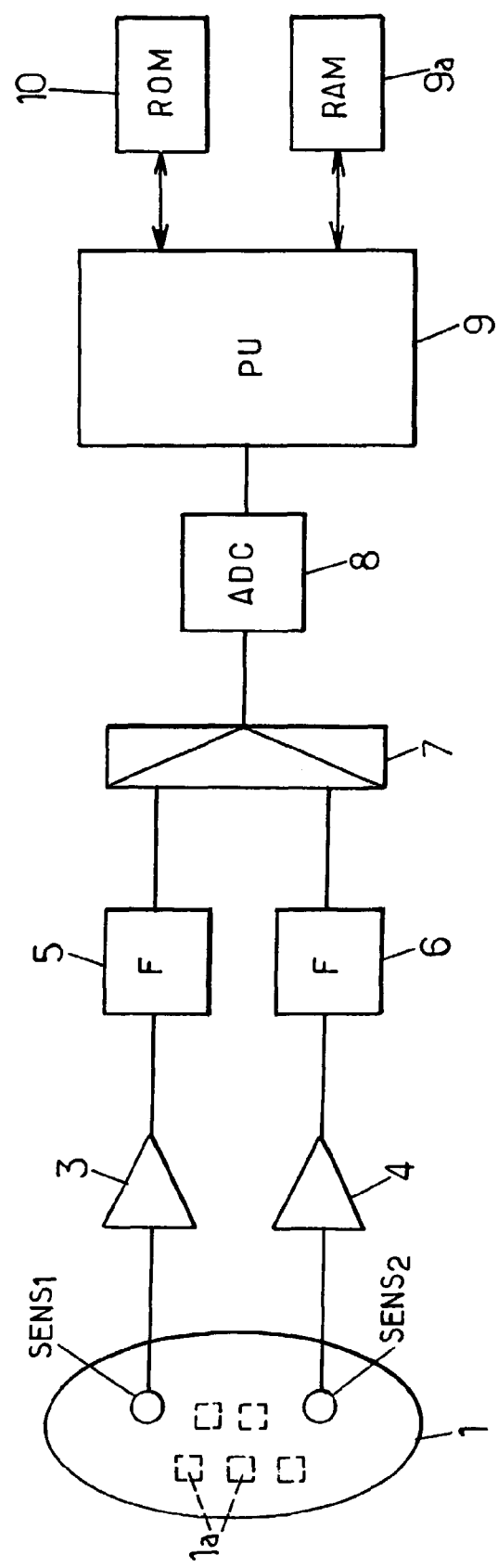
FIG. 1 is a schematic view of an example of device according to the invention.

As illustrated by FIG. 1, the present invention may be carried out for instance by a device comprising an object 1 and two acoustic sensors SENS1 and SENS2 borne by said object 1.

This object 1 may be for instance a table, a door, a wall, a screen or other things, and is made for instance of wood, metal, cement, glass or other materials. The acoustic sensors SENS1 and SENS2 may be for example piezoelectric sensors or any other sensor able to sample a vibration transmitted in the object, such as capacitive sensors, magnetostrictive sensors, electromagnetic sensors, acoustic velocimeters, optical sensors (laser interferometers, laser vibrometers), etc.

The output of the sensors SENS1, SENS2 may be connected respectively to amplifiers 3 and 4, the output of which is respectively connected to filters (F) 5, 6. The bandwidth of each filter 5 and 6 may be in the range of 300 Hz to 20000 Hz. The output of the filters 5, 6 is connected to a multiplexer 7, the output of which is connected to an analog to digital converter (ADC) 8. The output of the analog to digital converter 8 is connected to a processing unit (PU) 8 such as a microprocessor, a microcontroller, a DSP (digital signal processor), a programmable logical array (CPLD, FGPA), etc. The processing unit 9 may be connected to a RAM 9a and to a ROM 10.

The ROM 10, or any other memory communicating with the processing unit 9, contains a database of N reference signature functions $SIG_{Rj}(\omega)$, for j=1 ... N, corresponding to N predetermined active areas 1a of the object 1, as will be described hereafter. Each of these active areas may correspond for instance to a particular information, and may be materialized or not by a marking or other indication on the object.

The ROM 10 may be a hard disk, but also an EPROM, or an EEPROM, or likewise. Using an EEPROM can permit to reconfigure easily the device, for example for other applications, by recording new active areas 1a.

The reference signature functions may be for instance calculated during a learning step, e.g. before the device is used in normal use. The reference signature functions may be calculated for each single device 1-10, or these reference signature functions may be calculated only once for one device 1-10 and then used for all identical devices during normal use.

During the learning step, one generates an impact on each predetermined active area 1a of the object 1, which is sensed by sensors SENS1, SENS2. For each impact on an active area j (j=1 ... N), the sensors SENS1, SENS2 generate acoustic signals which are respectively amplified by amplifiers 3, 4, filtered by filters 5, 6, multiplexed by multiplexer 7 and sampled by analog to digital converter 8. Analog to digital converter 8 thus outputs two reference signals $r_{1j}(t)$, $r_{2j}(t)$ originating respectively from the two sensors SENS1, SENS2.

Respective Fourier transforms $R_{1j}(\omega)$, $R_{2j}(\omega)$ of the reference acoustic signals $r_{1j}(t)$, $r_{2j}(t)$ are then computed. The Fourier transform $R_{ij}(\omega)$ of each reference acoustic signal equals:

$$R_{ij}(\omega)=C_i(\omega)\cdot H_{Rij}(\omega)\cdot E_{Rj}(\omega), \tag{1}$$

where $C_i(\omega)$ is the Fourier transform of the impulse response of sensor i (i=1, 2), $H_{Rij}(\omega)$ is a propagation function, dependant on an acoustic wave propagation path in the object between active area j and sensor i, and $E_{Rj}(\omega)$ is the Fourier transform of the impact waveform on active area j.

Then, a reference signature function is calculated:

$$SIG_{Rj}(\omega)=R_1j(\omega)\cdot R_2j(\omega)^*, \tag{2}$$

where * is the complex conjugate operator.
When using equation (1) to develop equation (2), one obtains:

$$SIG_{Rj}(\omega)=C_1(\omega)\cdot H_{R1}j(\omega)\cdot E_{Rj}(\omega)\cdot C_2(\omega)^*\cdot H_{R2}j(\omega)^*\cdot E_{Rj}(\omega)^*. \tag{3}$$

$E_{Rj}(\omega)\cdot E_{Rj}(\omega)^*=|E_{Rj}(\omega)|^2$, so that equation (3) is equivalent to equation (4):

$$SIG_{Rj}(\omega)=C_1(\omega)\cdot C_2(\omega)^*\cdot H_{R1}j(\omega)\cdot H_{R2}j(\omega)^*\cdot |E_{Rj}(\omega)|^2 \tag{4}$$

During normal use of the device, when an impact is generated on the object 1, e.g. when a user hits or touches the object 1 with a finger or with another object (stylus, pen or else) the sensors SENS1, SENS2 receive acoustic signals. These acoustic signals are amplified by amplifiers 3 and 4, filtered by filters 5 and 6, multiplexed by multiplexer 7 and then sampled by analog to digital converter 8.

Figure 2:
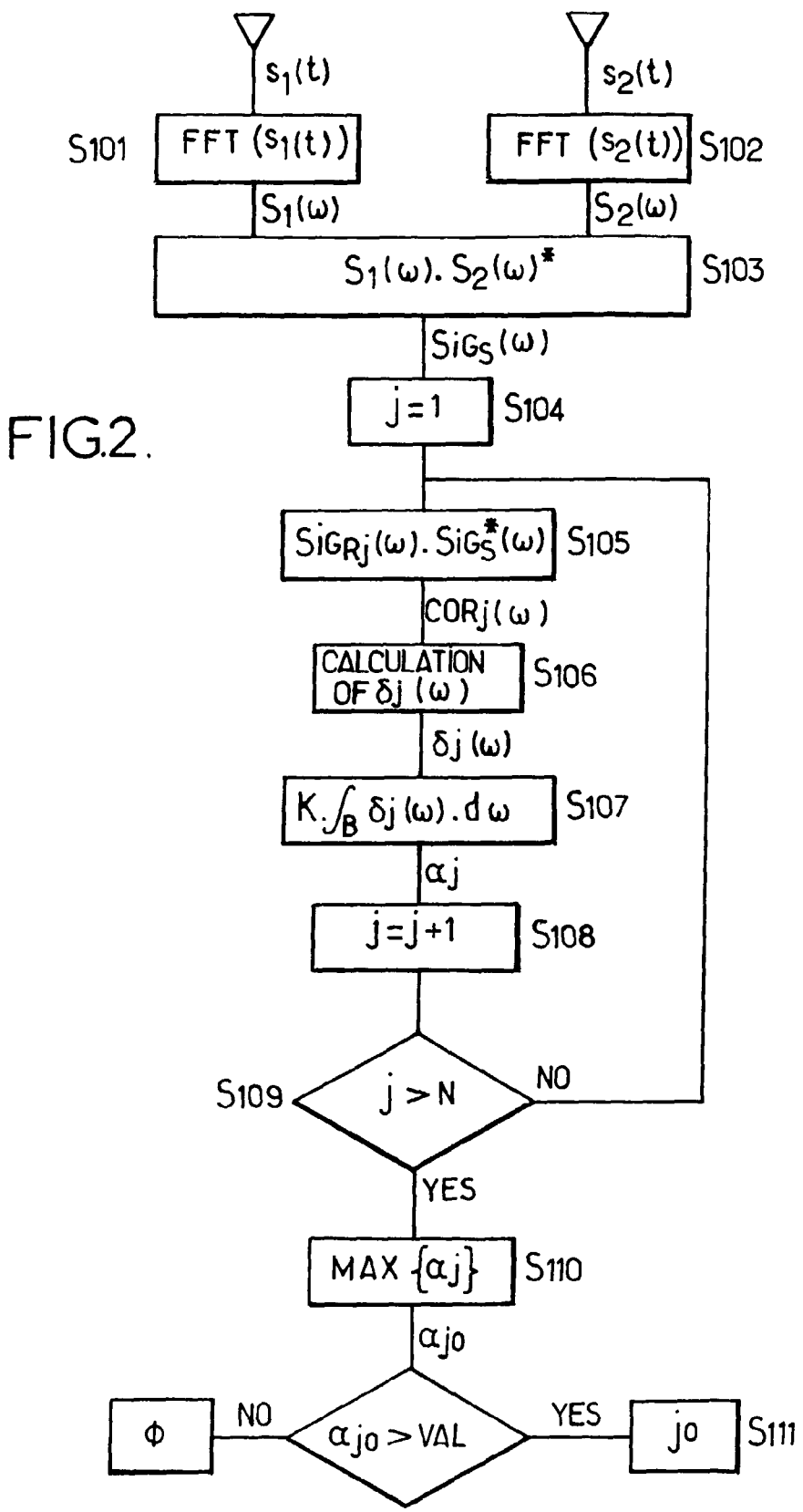
FIG. 2 is a flow chart describing a method according to a first embodiment of the invention.

The sampled signals $S_i(t)$ originating respectively from the sensors i (i=1, 2 in the present example) are then processed by processing unit 9, for instance according to a first embodiment of the method of the invention as shown in the flow chart of FIG. 2. This method may be carried out by a program ran on processing unit 9, comprising for instance calculation means S101-S103, comparison means S104-S110 and processing means S111.

In this embodiment, respective Fourier transforms $S_1(\omega)$ and $S_2(\omega)$ of the two sampled acoustic signals $S_1(t)$ and $S_2(t)$ are computed (preferably only for positive frequencies $\omega$) by calculation means in steps S101 and S102. These Fourier transforms may be Fast Fourier Transforms (FFT), permitting thus to obtain quick results, without a high calculation power.

The Fourier transform $S_i(\omega)$ of each acoustic signal equals:

$$S_i(\omega)=C_i(\omega)\cdot H_{Si}(\omega)\cdot E_S(\omega) \tag{5}$$

where $C_i(\omega)$ is the Fourier transform of the impulse response of sensor i, $H_{Si}(\omega)$ is a propagation function, dependant on an acoustic wave propagation path in the object between the location of the impact and sensor i, and $E_S(\omega)$ is the Fourier transform of the impact waveform.

At step S103, the calculating means compute a sample signature function:

$$SIG_S(\omega)=S_1(\omega)\cdot S_2(\omega)^*, \tag{6}$$

where * is the complex conjugate operator.
When using equation (5) to develop equation (6), one obtains:

$$SIG_S(\omega)=C_1(\omega)\cdot H_{S1}(\omega)\cdot E_S(\omega)\cdot C_2(\omega)^*\cdot H_{S2}(\omega)^*\cdot E_S(\omega)^*. \tag{7}$$

$E_S(\omega)\cdot E_S(\omega)^*=|E_S(\omega)|^2$, so that:

$$SIG_S(\omega)=C_1(\omega)\cdot C_2(\omega)^*\cdot H_{S1}(\omega)\cdot H_{S2}(\omega)^*\cdot |E_S(\omega)|^2 \tag{8}$$

After initializing comparison means at step S104, for each predetermined area j of the object, an intermediary estimator (correlation function) is calculated at step S105:

$$COR_j(\omega)=SIG_{Rj}(\omega)\cdot SIG_S(\omega)^*. \tag{9}$$

When using equations (4) and (8) to develop equation (9) one obtains equation (10):

$$COR_j(\omega)=|C_1(\omega)|^2\cdot |C_2(\omega)|^2\cdot |E_{Rj}(\omega)|^2\cdot |E_S(\omega)|^2\cdot H_{R1}j(\omega)\cdot H_{R2}j(\omega)^*\cdot H_{S1}(\omega)^*\cdot H_{S2}(\omega) \tag{10}$$

Since $|C_1(\omega)|^2$, $|C_2(\omega)|^2$, $|E_{Rj}(\omega)|^2$ and $|E_S(\omega)|^2$ are square moduluses whose phase equals zero, the phase $\phi(COR_j(\omega))$ of the intermediary estimator $COR_j(\omega)$ does not depend on the impulse responses $C_1(\omega)$, $C_2(\omega)$ of the sensors 3, 4 and on the impact waveforms $E_{Rj}(\omega)$, $E_S(\omega)$. This phase $\phi(COR_j(\omega))$ depends only on the phase of $H_{R1j}(\omega)\cdot H_{R2j}(\omega)^*\cdot H_{S1}(\omega)^*\cdot H_{S2}(\omega)$, i.e. on the acoustic wave propagation paths in the object during the learning step and the.

The method of the present invention is based on the observation that:
if the impact which generated the sampled signals $s_1(t)$, $s_2(t)$ was not on active area j, then the phase of $COR_j(\omega)$ is variable and different from 0,
whereas if the impact which generated the sampled signals $s_1(t)$, $s_2(t)$ was on active area j, then the phase of $COR_j(\omega)$ is equal to 0, since:

$$COR_j(\omega)=|C_1(\omega)|^2\cdot |C_2(\omega)|^2\cdot |E_{Rj}(\omega)|^2\cdot |E_S(\omega)|^2\cdot |H_1j(\omega)|^2\cdot |H_2j(\omega)|^2 \tag{11}.$$

Thus, it is possible to determine whether an impact on the object 1 was made on any active area 1a, and if so, to determine on which active area.

Since the method of the invention is based on direct or indirect determination of the phase of $COR_j(\omega)$, it should be noted that the accuracy of this method is not altered by the use of different types of impact or by the use of sensors 3, 4 of different characteristics, because this phase is in any case independent from the impact waveforms used during the learning step and during normal use, and because this phase is also independent from the responses of the sensors SENS1, SENS2.

Figure 3A:
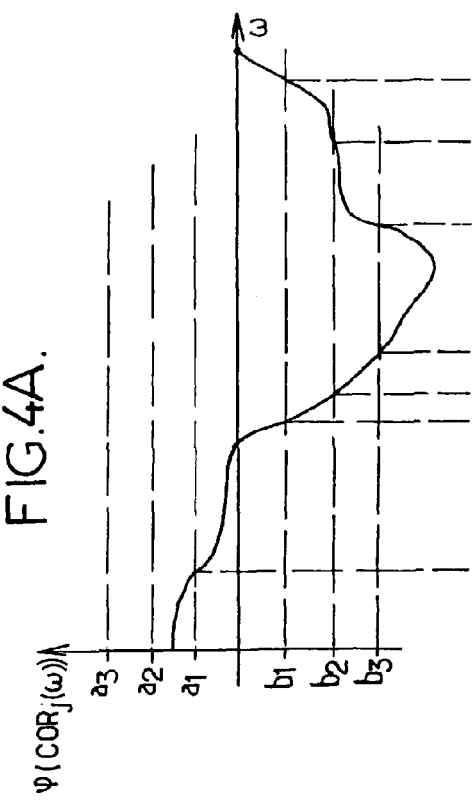
FIGS. 3A and 3B are graphics illustrating the calculation of a similarity estimator according to the first embodiment of the invention.
Figure 3B:
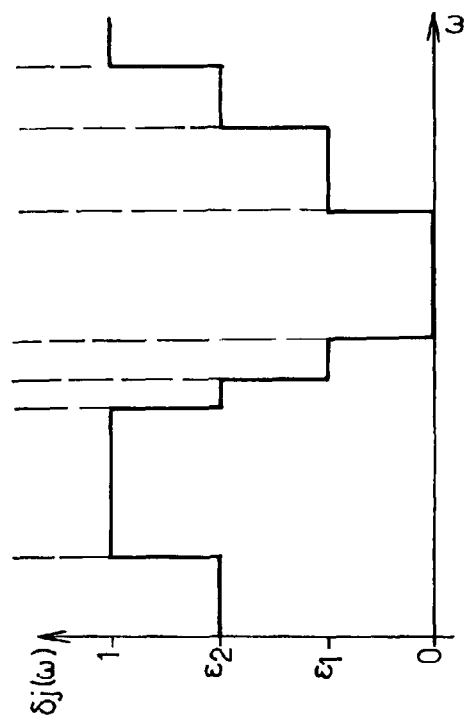

In steps S106 and S107, the phase $\phi(COR_j(\omega))$ is examined, to estimate how much $SIG_S(\omega)$ matches with $SIG_{Rj}(\omega)$. To this end, the comparison means may calculate a function $\delta_j(\omega)$ in Step 106, as shown FIGS. 3A and 3B. This function $\delta_j(\omega)$ may be calculated as follows:

if the phase $\phi(COR_j(\omega))$ belongs to, for example, an angular interval $I_1=[b1;a1]$, with $a_1>0$ and $b_1<0$, then $\delta_j(\omega)=\epsilon_1=1$;

else, $\delta_j(\omega)=\epsilon_2=0$.

It should be noted that, in step S106, it is not necessary to compute $\phi(COR_j(\omega))$. For instance, if $b_1=-a1$, the function $\delta_j(\omega)$ may as well be calculated as follows:

if $Re(COR_j(\omega))>|Im(COR_j(\omega))|/\tan(a1)$, then $\delta_j(\omega)=\epsilon_1=1$;

else, $\delta_j(\omega)=\epsilon_2=0$.

In step S107, the function $\delta_j(\omega)$ is integrated on a study frequency interval $B=[\omega_{min}, \omega_{max}]$ in order to obtain a similarity estimator $\alpha_j=K\cdot\int_B \delta_j(\omega)\cdot d\omega$, where K is for example a constant of normalization, which equals to (or is proportional to) the inverse of the length of the interval B: $K=1/(\omega_{max}-\omega_{min})$.

This estimator $\alpha_j$ is simple to compute, does not require a high calculation power and correctly represents the similarity of the sampled signals $s_1(t)$, $s_2(t)$ with the reference signals $r_1(t)$, $r_2(t)$.

Once the N similarity estimators $\alpha_j$ are calculated and stored in a memory, the maximal similarity estimator $\alpha_{j_0}$ is determined by comparison means in step S110. This can be carried out with a simple sequence of comparisons. In a variant, the maximum similarity estimator $\alpha_{j_0}$ can be determined in each iteration of the comparison means when computing the similarity estimators $\alpha_j$.

In order to eventually determine the active area in which an impact occurred, the greatest similarity estimator $\alpha_{j_0}$ has to be greater than a predetermined threshold of confidence VAL in step S111. For example, $\alpha_{j_0}$ has to be greater than VAL=0.5 to be recognized as valid. If $\alpha_{j_0}$ is greater than this threshold of confidence VAL, the active area $j_0$ is determined by processing means as the active area in which an impact occurred. Then, an information associated to this active area may be transmitted to a software, or an action can be launched by the processing means 9, etc. Else, the impact is considered as interference or as perturbation.

Figure 4A:
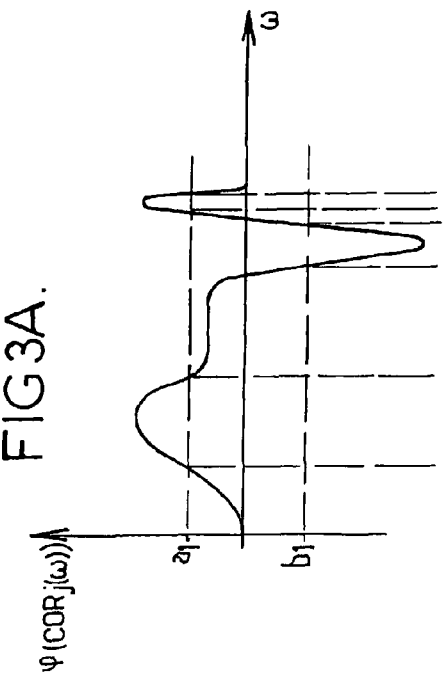
FIGS. 4A and 4B are graphics illustrating the calculation of a similarity estimator according to a second embodiment of the invention.
Figure 4B:
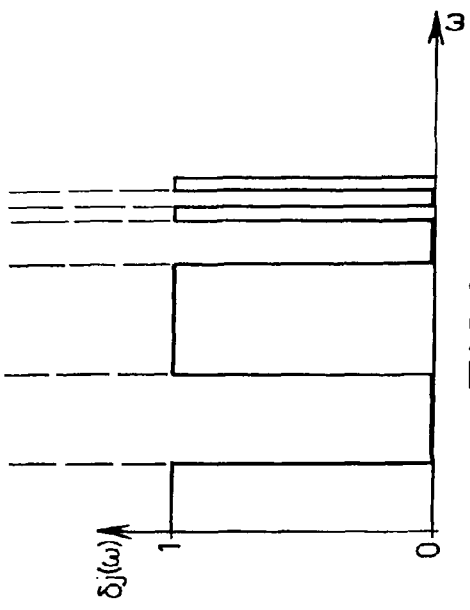

In a second embodiment of the invention, several angular intervals $I_i$ may be used in step 106, the other steps remaining the same as in the first embodiment. For example, FIGS. 4A and 4B illustrate such a construction in the example of 4 possible values of $\alpha_j$ according to the phase $\phi(COR_j(\omega))$.

There, the phase $\phi(COR_j(\omega))$ is studied as follows:

if the phase $\phi(COR_j(\omega))$ belongs to the interval $I_1=[b_1;a_1]$ with $a_1>0$ and $b_1<0$, then, then $\delta_j(\omega)=\epsilon_1=1$;

if the phase $\phi(COR_j(\omega))$ belongs to the interval $I_2=[b_2;b_1$ $[=]a_1;a_2]$, with $a_2>a_1$ and $b_2<b_1$, then $\delta_j(\omega)=\epsilon_2$, with $\epsilon_2<1$;

if the phase $\phi(COR_j(\omega))$ belongs to the interval $I_3=[b_3;b_2$ $[\cup]a_2;a_3]$, with $180°>a_3>a_2$ and $-180°<b_3<b_2$ (preferably with $90°>a_3>a_2$ and $-90°<b_3<b_2$), then $\delta_j(\omega)=\delta_3$, with $\epsilon_3<\epsilon_2$;

else, $\delta_j(\omega)=\epsilon_4=0$.

As in the first embodiment of the invention, it should be noted that, in step S106, it is not necessary to compute $\phi(COR_j(\omega))$. For instance, if $b_1=-a_1$, $b_2=-a_2$, and $b_3=-a_3$, then the function $\delta_j(\omega)$ may as well be calculated as follows:

if $Re(COR_j(\omega))\geq|Im(COR_j(\omega))|/\tan(a_1)$, then $\delta_j(\omega)=\delta_1=1$;

if $|Im(COR_j(\omega))|/\tan(a_1)>Re(COR_j(\omega))\geq|Im(COR_j(\omega))|/\tan(a_2)$, then $\delta_j(\omega)=\epsilon_2$;

if $|Im(COR_j(\omega))|/\tan(a_2)>Re(COR_j(\omega))\geq|Im(COR_j(\omega))|/\tan(a_3)$, then $\delta_j(\omega)=\epsilon_3$;

else, $\delta_j(\omega)=0$.

$Re(COR_j(\omega))$ and $Im(COR_j(\omega))$ are respectively the real part and the imaginary part of the complex number $COR_j(\omega)$.

For instance, $\epsilon_2$ and $\epsilon_3$ could respectively equal $\cos(a_1)$ and $\cos(a_2)$.

More generally, the phase of $COR_j(\omega)$ could be compared to a plurality of n angular thresholds $0<a_1<a_2<\ldots<a_n$ as follows:

if $Re(COR_j(\omega))\geq|Im(COR_j(\omega))|/\tan(a_1)$, then $\delta_j(\omega)=\epsilon_1=1$;

if $|Im(COR_j(\omega))|/\tan(a_1)>Re(COR_j(\omega))\geq|Im(COR_j(\omega))|/\tan(a_2)$, then $\delta_j(\omega)=\epsilon_2$;

if $|Im(COR_j(\omega))|/\tan(a_2)>Re(COR_j(\omega))\geq|Im(COR_j(\omega))|/\tan(a_3)$, then $\delta_j(\omega)=\epsilon_3$;

. . .

$$\text{if } |Im(COR_j(\omega))|/\tan(a_{k-1})>Re(COR_j(\omega))\geq|Im(COR_j(\omega))|/\tan(a_k), \text{ then } \delta_j(\omega)=\epsilon_k; \quad (12)$$

. . .

if $|Im(COR_j(\omega))|/\tan(a_{n-2})>Re(COR_j(\omega))\geq|Im(COR_j(\omega))|/\tan(a_{n-1})$, then $\delta_j(\omega)=\epsilon_{n-1}$;

else, $\delta_j(\omega)=\epsilon_n=0$.

The values $\epsilon_k$ are such that $\epsilon_1>\epsilon_2>>\epsilon_n>0$, and these values may for instance equal: $\epsilon_k=\cos(a_{k-1})$, for $k=2, \ldots n$ and $\epsilon_{n+1}=0$.

In this second embodiment the other steps of the method can be identical to those described above with regards to the first embodiment.

In a third embodiment of the invention, as illustrated for instance in FIG. 5, the calculation of the above correlation function $COR_j(\omega)$ ($j=1, \ldots N$) is avoided.

As a matter of fact, $SIG_{Rj}(\omega)=A_j(\omega)+jB_j(\omega)$ ($A_j$ and $B_j$ are respectively the real and imaginary parts of $SIG_{Rj}$), and $SIG_S(\omega)^*=C(\omega)+jD(\omega)$ (C and D are respectively the real and imaginary parts of $SIG_S$), so that the above equation (12) can be written as follows:

$$|B_j(\omega)C(\omega)+A_j(\omega)D(\omega)|/\tan(a_{k-1})>A_j(\omega)C(\omega)-B_j(\omega)D(\omega)>|B_j(\omega)C(\omega)+A_j(\omega)D(\omega)|/\tan(a_k) \quad (13)$$

$\Leftrightarrow$ $$|B_j(\omega)|\cdot|C(\omega)|\cdot|+\{A_j(\omega)/B_j(\omega)\}\cdot\{(D(\omega)/C(\omega)\}|/\tan(a_{k-1})>A_j(\omega)C(\omega)-B_j(\omega)D(\omega)>|B_j(\omega)|\cdot|C(\omega)|\cdot|+\{A_j(\omega)/B_j(\omega)\}\cdot\{(D(\omega)/C(\omega)\}|/\tan(a_k) \quad (14)$$

$\Leftrightarrow$ $$\beta_j(\omega)/\tan(a_{k-1})>\gamma_j(\omega)>\beta_j(\omega)/\tan(a_k) \quad (15)$$

wherein:

$\beta_j(\omega)=|+\{A_j(\omega)/B_j(\omega)\}\cdot\{(D(\omega)/C(\omega)\}|$ $\gamma_j(\omega)=\text{sign } B_j(\omega)\cdot\text{sign } C(\omega)\cdot[\{A_j(\omega)/B_j(\omega)\}-\{D(\omega)/C(\omega)\}]$;

sign $B_j(\omega)=1$ if $B_j(\omega)$ is positive and $=-1$ if $B_j(\omega)$ is negative;

sign $C(\omega)=1$ if $C(\omega)$ is positive and $=-1$ if $C(\omega)$ is negative.

Therefore, this third embodiment, instead of calculating the correlation functions $COR_j(\omega)$, the above functions $\beta_j(\omega)$ and $\gamma_j(\omega)$ are calculated in step S105. It should be noted that this calculation is particularly simple, and only requires:

that sign $B_j(\omega)$ and the ratio $A_j(\omega)/B_j(\omega)$ be stored in advance in memory 10 for $j=1$, N (i.e. one real number+1 bit, whereas the complete calculation of the $COR_j(\omega)$ implied to store the complete reference signature functions (a complex number, i.e. the equivalent of two real numbers);

that sign $C(\omega)$ and the ratio $D(\omega)/C(\omega)$ be stored at the beginning of step S105, after which only a very limited number of operations remain to be done at step S105 to calculate $\beta_j(\omega)$ and $\gamma_j(\omega)$.

Then, at step S106, the phase of $COR_j(\omega)$ is compared to n−1 angular thresholds $0<a_1<a_2<\ldots<a_{n-1}$ through equation (15) as follows:

if $\gamma_j(\omega) \geq \beta_j(\omega)/\tan(a_1)$, then $\delta_j(\omega) = \epsilon_1 = 1$;

. . .

if n is greater than 2 and $\beta_j(\omega)/\tan(a_{k-1}) > \gamma_j(\omega) \geq \beta_j(\omega)/\tan(a_k)$, then $\delta_j(\omega) = \epsilon_k$, for $k=2, \ldots n-1$;

else, $\delta_j(\omega) = \epsilon_n = 0$.

The values $\epsilon_k$ are such that $\epsilon_1 > \epsilon_2 > \ldots > \epsilon_n > 0$, and these values may for instance equal: $\epsilon_k = \cos(a_{k-1})$, for $k=2, \ldots n$.

If $n=1$, this comparison is limited to:

if $\gamma_j(\omega) \geq \beta_j(\omega)/\tan(a_1)$, then $\delta_j(\omega) = 1$;

else, $\delta_j(\omega) = 0$.

The subsequent steps S107-S111 of the method may be identical to the steps explained above for the first and second embodiments of the invention.

According to one further embodiment of the invention, the sampling of the acoustic signals may be triggered only if the signals received by the analog to digital converter 8 are greater than a trigger threshold. Consequently, the device only samples relevant acoustic signals. This permits to reduce the interference sensibility. In this embodiment, the sampled signals $S_1(t)$ and $S_2(t)$ may be delayed compared to the real signals. As a matter of fact, to avoid that the trigger threshold prevents the record of the very beginning of acoustic signals, a delay device may be added, in order to record the waveform of the signal a few microseconds before the sampling step is triggered.

The invention claimed is:

1. A method for determining the position of impacts on an object, said object comprising:
   two acoustic sensor;
   N predetermined active areas, whereby N is an integer at least equal to 1;
said method comprising the steps of:
(a) receiving two acoustic signals $S_1(t)$ and $S_2(t)$ originating respectively from said acoustic sensors and generated by an impact received on said object;
(b) calculating, using at least one processing unit, a sample signature function:

$$SIG_S(\omega) = S_1(\omega) \cdot S_2(\omega)^*,$$

where $S_1(\omega)$ and $S_2(\omega)$ are the respective Fourier transforms of $S_1(t)$ and $S_2(t)$, and where * is the complex conjugate operator;
(c) comparing $SIG_S(\omega)$ with N predetermined reference signature functions $SIG_{Rj}(\omega)$ each corresponding to a predetermined active area j, for j from 1 to N;
(d) determining an active area in which the impact occurred, on the basis of the comparison of step (c).

2. The method as claimed in claim 1, wherein each reference signature function equals:

$$SIG_{Rj}(\omega) = R_{1j}(\omega) \cdot R_{2j}(\omega)^*$$

where $R_{1j}(\omega)$ and $R_{2j}(\omega)$ are Fourier transforms of acoustic signals $r_{1j}(t)$ and $r_{2j}(t)$ received by each of the respective acoustic sensors when an impact occurs on the predetermined area j.

3. The method as claimed in claim 1, wherein step (c) comprises the calculation of a similarity estimator $\alpha_j$ representing a function of the phase $\phi(COR_j(\omega))$ of $COR_j(\omega) = SIG_{Rj}(\omega) \cdot SIG_S(\omega)^*$.

4. The method as claimed in claim 3, wherein step (c) comprises the calculation of a function $\delta_j(\omega)$ for j from 1 to N, wherein $\delta_j(\omega) = \epsilon_k$, if $\phi(COR_j(\omega))$ belongs to $I_k$, where $\epsilon_k$ is a predetermined value and $I_k$ a corresponding angular interval for k from 1 to n, where n is an integer greater than 1.

5. The method as claimed in claim 4, wherein the values $\epsilon_i$ are not greater than 1.

6. The method as claimed in claim 4 or claim 5, wherein:

if $|\phi(COR_j(\omega))| \leq a1$, then $\delta_j(\omega) = \epsilon_1$,

. . .

if n is greater than 2 and $a_{k-1} < |\phi(COR_j(\omega))| \leq a_k$, then $\delta_j(\omega) = \epsilon_k$, for $k=2 \ldots n-1$,

. . .

if $|\phi(COR_j(\omega))| > a_{n-1}$, then $\delta_j(\omega) = \epsilon_n$, wherein $a_k$ is increasing with k and $\epsilon_k$ is decreasing with k.

7. The method as claimed in claim 6, wherein:

if $Re(COR_j(\omega)) \geq |Im(COR_j(\omega))|/\tan(a_1)$, then $\delta_j(\omega) = \epsilon_1$,

. . .

if n is greater than 2 and $|Im(COR_j(\omega))|/\tan(a_{k-1}) > Re(COR_j(\omega)) \geq Im(COR_j(\omega))|/\tan(a_k)$, then $\delta_j(\omega) = \epsilon_k$, for $k=2 \ldots n-1$,

. . .

else, $\delta_j(\omega) = \epsilon_n$, and wherein $Re(COR_j(\omega))$ is the real part of $COR_j(\omega)$ and $Im(COR_j(\omega))$ is the imaginary part of $COR_j(\omega)$.

8. The method according to claim 6, wherein:

if $\gamma_j(\omega) \geq \beta_j(\omega)/\tan(a_1)$, then $\delta_j(\omega) = \epsilon_1 = 1$;

. . .

if n is greater than 2 and $\beta_j(\omega)/\tan(a_{k-1}) > \gamma_j(\omega) \geq \beta_j(\omega)/\tan(a_k)$, then $\delta_j(\omega) = \epsilon_k$, for $k=2, \ldots n-1$;

. . .

else, $\delta_j(\omega) = \epsilon_n$, and wherein:

$\beta_j(\omega) = |1 + \{A_j(\omega)/B_j(\omega)\} \cdot \{(D(\omega)/C(\omega)\}|$, $\gamma_j(\omega) = \text{sign } B_j(\omega) \cdot \text{sign } C(\omega) \cdot [\{A_j(\omega)/B_j(\omega)\} - \{D(\omega)/C(\omega)\}]$, sign $B_j(\omega) = 1$ if $B_j(\omega)$ is positive and $=-1$ if $B_j(\omega)$ is negative, sign $C(\omega) = 1$ if $C(\omega)$ is positive and $=-1$ if $C(\omega)$ is negative, $A_j(\omega)$ and $B_j(\omega)$ are respectively the real part and the imaginary part of each reference signature function $SIG_{Rj}(\omega)$, $C(\omega)$ and $D(\omega)$ are respectively the real part and the imaginary part of the complex conjugate sample signature function $SIG_S(\omega)^*$.

9. The method as claimed in claim 6, wherein $\epsilon_1 = 1$ and $\epsilon_n = 0$.

10. The method as claimed in claim 9, wherein n is greater than 2 and $\epsilon_k = \cos(a_{k-1})$, for $k=2, \ldots n-1$.

11. The method as claimed in claim 4, wherein $$\alpha_j = K \cdot \int_B \delta_j(\omega) \cdot d\omega,$$

where B is a frequency interval and K a constant.

12. The method as claimed in claim 11, wherein $B=[\omega_{min}, \omega_{max}]$ and K is proportional to $1/(\omega_{max} - \omega_{min})$.

13. The method as claimed in claim 3, wherein the active area $j_0$ in which the impact occurred is determined such that $\alpha_{j_0}$ is the greatest similarity estimator among the N calculated similarity estimators $\alpha_j$.

14. The method as claimed in claim 13, wherein it is concluded that the impact occurred in the area $j_0$ only if $\alpha_{j_0}$ is considered as valid in step (d).

15. The method of claim 14, wherein $\alpha_{j_0}$ is considered as valid if $\alpha_{j_0}$ is greater than a predetermined threshold of confidence.

16. The method as claimed in claim 14, wherein it is concluded that there is no impact if $\alpha_{j_0}$ is not considered as valid in step (d).

17. The method as claimed in claim 1, wherein step (a) begins if the acoustic signals $s_1(t)$ and $S_2(t)$ are above a predetermined trigger threshold.

18. The method as claimed in claim 1, wherein the acoustic signals $s_1(t)$ and $S_2(t)$ in step (a) are delayed relative to real audio signals.

19. The method as claimed in claim 1, wherein the Fourier transform is a Fast Fourier transform.

20. A device for determining the position of impacts on an object, comprising:
two acoustic sensors adapted to be borne by said object for receiving acoustic signals $S_1(t)$ and $s_2(t)$ generated by an impact on said object;
memory means comprising N reference signature functions, corresponding to N predetermined active areas of said object, whereby N is an integer at least equal to 1;
calculation means for calculating a sample signature function $$SIG_S(\omega)=S_1(\omega) \cdot S_2(\omega)^*,$$

where $S_1(\omega)$ and $S_2(\omega)$ are the respective Fourier transforms of $S_1(t)$ and $S_2(t)$, and where * is the complex conjugate operator;
comparison means for comparing $SIG_S(\omega)$ with N predetermined reference signature functions $SIG_{R_j}(\omega)$ for j from 1 to N;
processing means for determining an active area in which the impact occurred, on the basis of results given by said the comparison means.

21. The device as claimed in claim 20, wherein each reference signature function equals:

$$SIG_{R_j}(\omega)=R_{1j}(\omega) \cdot R_{2j}(\omega)^*$$

where $R_{1j}(\omega)$ and $R_{2j}(\omega)$ are Fourier transforms of acoustic signals $r_{1j}(t)$ and $r_{2j}(t)$ received by each of the respective acoustic sensors when an impact occurs on the predetermined area j.

22. The device as claimed in claim 20, wherein said comparison means are adapted to calculate a similarity estimator $\alpha_j$ representing a function of the phase $\phi(COR_j(\omega))$ of $COR_j(\omega)=SIG_{R_j}(\omega) \cdot SIG_S(\omega)^*$.

23. The device as claimed in claim 22, wherein said comparison means are adapted to calculate a function $\delta_j(\omega)$ for j from 1 to N, wherein
$\delta_j(\omega)=\epsilon_k$, if $\phi(COR_j(\omega))$ belongs to $I_k$, where $\epsilon_k$ is a predetermined value and $I_k$ a corresponding angular interval for k from 1 to n, where n is an integer greater than 1.

24. The device as claimed in claim 23, wherein the values $S_1$ are not greater than 1.

25. The device as claimed in claim 23, wherein said comparison means are adapted so that:
if $|\phi(COR_j(\omega))| \leq a1$, then $\delta_j(\omega)=\epsilon_1$,
...
if n is greater than 2 and $a_{k-1}<|\phi(COR_j(\omega))| \leq a_k$, then $\delta_j(\omega)=\epsilon_k$, for k=2 ... n-1,
...
if $|\phi(COR_j(\omega))|>a_{n-1}$, then $\delta_j(\omega)=\epsilon_n$,
wherein $a_k$ is increasing with k and $\epsilon_k$ is decreasing with k.

26. The device as claimed in claim 25, wherein said comparison means are adapted so that:
if $Re(COR_j(\omega)) \geq |Im(COR_j(\omega))|/\tan(a_1)$, then $\delta_j(\omega)=\epsilon_1$,
...
if n is greater than 2 and $|Im(COR_j(\omega))|/\tan(a_{k-1})>Re(COR_j(\omega)) \geq |Im(COR_j(\omega))|/\tan(a_k)$, then $\delta_1(\omega)=\epsilon_k$, for k=2 ... n-1,
...
else, $\delta_j(\omega)=\epsilon_n$,
and wherein $Re(COR_j(\omega))$ is the real part of $COR_j(\omega)$ and $Im(COR_j(\omega))$ is the imaginary part of $COR_j(\omega)$.

27. The device according to claim 25, wherein said comparison means are adapted so that:
if $\gamma_j(\omega) \geq \beta_j(\omega)/\tan(a_1)$, then $\delta_j(\omega)=\epsilon_1=1$;
...
if n is greater than 2 and $\beta_j(\omega)/\tan(a_{k-1})>\gamma_j(\omega) \geq \beta_j(\omega)/\tan(a_k)$, then $\delta_j(\omega)=\epsilon_k$, for k=2, ... n-1;
...
else, $\delta_j(\omega)=\epsilon_n$,
and wherein:
$\beta_j(\omega)=|1+\{A_j(\omega)/B_j(\omega)\} \cdot \{(D(\omega)/C(\omega)\}|$,
$\gamma_j(\omega)=sign\ B_j(\omega) \cdot sign\ C(\omega) \cdot [\{A_j(\omega)/B_j(\omega)\}-\{D(\omega)/C(\omega)\}]$,
$sign\ B_j(\omega)=1$ if $B_j(\omega)$ is positive and $=-1$ if $B_j(\omega)$ is negative,
$sign\ C(\omega)=1$ if $C(\omega)$ is positive and $=-1$ if $C(\omega)$ is negative,
$A_j(\omega)$ and $B_j(\omega)$ are respectively the real part and the imaginary part of each reference signature function $SIG_{R_j}(\omega)$,
$C(\omega)$ and $D(\omega)$ are respectively the real part and the imaginary part of the complex conjugate sample signature function $SIG_S(\omega)^*$.

28. The device as claimed in claim 25, wherein $\epsilon_1=1$ and $\epsilon_n=0$.

29. The device as claimed in claim 28, wherein n is greater than 2 and $\epsilon_k=\cos(a_{k-1})$, for k=2, ... n-1.

30. The device as claimed in claim 23, wherein said comparison means are adapted so that:

$$\alpha_j=K \cdot \int_B \delta_j(\omega) \cdot d\omega,$$

where B is a frequency interval and K a constant.

31. The device as claimed in claim 22, wherein the processing means are adapted to determine the active area $j_0$ in which the impact occurred such that $\alpha_{j_0}$ is the greatest similarity estimator among the N calculated similarity estimators $\alpha_j$.

32. The device as claimed in claim 31, wherein the processing means are adapted to determine that the impact occurred in the area $j_0$ only if $\alpha_{j_0}$ is considered as valid.

33. The device of claim 32, wherein the processing means are adapted to determine that $\alpha_{j_0}$ is valid if $\alpha_{j_0}$ is greater than a predetermined threshold of confidence.

34. The device as claimed in claim 32, wherein the processing means are adapted to determine that there is no impact if $\alpha_{j_0}$ is not considered as valid.

* * * * *

UNITED STATES PATENT AND TRADEMARK OFFICE
CERTIFICATE OF CORRECTION

PATENT NO. : 8,392,486 B2  
APPLICATION NO. : 11/813113  
DATED : March 5, 2013  
INVENTOR(S) : Ing Page 1 of 1

It is certified that error appears in the above-identified patent and that said Letters Patent is hereby corrected as shown below:

In the Specification

Column 1,
Lines 43 and 50, "$S_1(t)$ and $S_2(t)$" should read --$s_1(t)$ and $s_2(t)$--;
Line 65, "$R_{1j}(t)$" should read --$r_{1j}(t)$--.

Column 2,
Line 60 and 62, "$S_1(t)$ and $S_2(t)$" should read --$s_1(t)$ and $s_2(t)$--.

Column 3,
Lines 2 and 12, "$S_1(t)$ and $S_2(t)$" should read --$s_1(t)$ and $s_2(t)$--.

Column 6,
Line 14, "$S_1(t)$ and $S_2(t)$" should read --$s_1(t)$ and $s_2(t)$--.

Column 9,
Lines 42 and 50, "$S_1(t)$ and $S_2(t)$" should read --$s_1(t)$ and $s_2(t)$--.

In the Claims

Column 10,
Line 66, "$S_2(t)$" should read --$s_2(t)$--.

Column 11,
Line 2, "$S_2(t)$" should read --$s_2(t)$--;
Line 9, "$S_1(t)$" should read --$s_1(t)$--;
Line 18, "$S_1(t)$ and $S_2(t)$" should read --$s_1(t)$ and $s_2(t)$--;
Line 43, "$S_1$" should read --$\varepsilon_1$--.

Signed and Sealed this
Twenty-seventh Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,392,486 B2
APPLICATION NO. : 11/813113
DATED : March 5, 2013
INVENTOR(S) : Ros Kiri Ing It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1586 days.

Signed and Sealed this

First Day of September, 2015

Michelle K. Lee
*Director of the United States Patent and Trademark Office*